United States Patent
Kim

(10) Patent No.: US 8,098,340 B2
(45) Date of Patent: Jan. 17, 2012

(54) LIQUID CRYSTAL DISPLAY SUBSTRATE HAVING A STORAGE DUPLICATION WIRING AND FIRST AND SECOND STORAGE WIRINGS CONFIGURED TO INDEPENDENTLY RECEIVE A MAINTAINING VOLTAGE

(75) Inventor: Dong-Gyu Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 92 days.

(21) Appl. No.: 11/823,490

(22) Filed: Jun. 27, 2007

(65) Prior Publication Data

US 2007/0296880 A1 Dec. 27, 2007

(30) Foreign Application Priority Data

Jun. 27, 2006 (KR) .................. 10-2006-0057799

(51) Int. Cl.
*G02F 1/1343* (2006.01)
*G02F 1/136* (2006.01)

(52) U.S. Cl. .......................... 349/39; 349/48

(58) Field of Classification Search ............. 349/38, 349/48, 129, 39, 56, 142, 149, 150
See application file for complete search history.

(56) References Cited

U.S. PATENT DOCUMENTS

| | | | | |
|---|---|---|---|---|
| 6,040,882 A * | 3/2000 | Jun et al. | | 349/39 |
| 2004/0263756 A1 * | 12/2004 | Tak et al. | | 349/145 |
| 2005/0030460 A1 * | 2/2005 | Kim et al. | | 349/139 |
| 2005/0052602 A1 * | 3/2005 | Liu | | 349/141 |
| 2005/0094078 A1 * | 5/2005 | Kang | | 349/141 |
| 2005/0162598 A1 * | 7/2005 | Choi et al. | | 349/139 |
| 2005/0213011 A1 * | 9/2005 | Kim et al. | | 349/139 |
| 2006/0103800 A1 * | 5/2006 | Li et al. | | 349/129 |
| 2006/0158576 A1 * | 7/2006 | Kim et al. | | 349/38 |
| 2007/0030407 A1 * | 2/2007 | Kwak et al. | | 349/38 |

FOREIGN PATENT DOCUMENTS

KR 1993-0006979 4/1993
KR 1020040077536 A 9/2004

* cited by examiner

*Primary Examiner* — Mark Robinson
*Assistant Examiner* — Paul Lee
(74) *Attorney, Agent, or Firm* — Innovation Counsel LLP

(57) ABSTRACT

A substrate for an LCD includes a transparent substrate, a pixel electrode, first and second storage wirings, and a storage duplication wiring. The pixel electrode is patterned as a unit pixel area on a thin film transistor layer formed on the substrate. The pixel electrode includes a first sub electrode receiving a first pixel voltage from the thin film transistor layer and a second sub electrode electrically separated from the first sub electrode and receiving a second pixel voltage. The first and second storage wirings are formed in the unit pixel area and respectively maintain the first and second pixel voltages during an image frame. The storage duplication wiring is formed along edges of the unit pixel area and is electrically connected to the first and second storage wirings. The substrate reduces pixel defects and improves display image quality.

17 Claims, 12 Drawing Sheets

LIQUID CRYSTAL DISPLAY SUBSTRATE HAVING A STORAGE DUPLICATION WIRING AND FIRST AND SECOND STORAGE WIRINGS CONFIGURED TO INDEPENDENTLY RECEIVE A MAINTAINING VOLTAGE

RELATED APPLICATIONS

This application claims priority of Korean Patent Application No. 2006-57799, filed Jun. 27, 2006, the entire disclosure of which is incorporated herein by reference.

BACKGROUND

This disclosure relates to liquid crystal displays (LCDs), in general, and in particular, to substrates for liquid crystal display panels that reduce pixel defects in panels incorporating them.

LCD display panels include an array substrate having thin film transistors (TFTs) and pixel electrodes, a color substrate having color filters and a common electrode, and a layer of a liquid crystal material disposed between the array substrate and the color filter substrate. The array substrate further includes a plurality of gate wirings and a plurality of source wirings crossing each other and defining a plurality of unit pixels, with one of the TFTs and one of the pixel electrodes being formed in each of the unit pixels.

Each of the TFTs is electrically connected to an associated one of the pixel electrodes, and is operable to couple an electric charge onto the pixel electrode. An electric field is formed between the pixel electrode and the common electrode that controls the arrangement of the molecules of the liquid crystal material and thereby controls the amount of light transmitted through the pixel.

The electric charge coupled onto the pixel electrode maintains the electric field between the two electrodes during an image frame by means of a storage capacitor formed in the unit pixel area between an associated storage wiring and the pixel electrode. When the storage wiring is disconnected, or when the storage wiring is short-circuited with an adjacent data wiring, the storage capacitor in the unit pixel area is not formed normally, so that the unit pixel cannot control the liquid crystal material correctly, thereby causing a defective pixel.

Recently, in order to improve the side viewing angle of an LCD panel, a design has been put forward in which the pixel electrode is divided into a first sub electrode and a second sub electrode. A first pixel voltage is applied to the first sub electrode, and a second pixel voltage, which is larger than the first pixel voltage, is applied to the second sub electrode. As a result, the directions in which the molecules of the liquid crystal layer in the unit pixel area are more diverse, so that the side viewing angle of the LCD panel is desirably improved.

However, when the pixel electrode is divided into first and sub electrodes, the number of defects of the associated storage capacitor for maintaining the first pixel voltage and the second pixel voltage using only one storage wiring is increased.

BRIEF SUMMARY

In accordance with the exemplary embodiments thereof described herein, substrates for LCD display panels are provided that reduce or eliminate pixel defects caused by storage wiring defects, thereby enabling the production of display panels without defective pixels.

In one exemplary embodiment, a display substrate includes a substrate, a pixel electrode, first and second storage wirings and a storage duplication wiring. The substrate includes a thin film transistor (TFT) layer. The pixel electrode is patterned in the shape of a unit pixel area on the TFT layer and includes first and second sub electrodes. The first sub electrode receives a first pixel voltage from the TFT layer, and the second sub electrode is electrically separated from the first sub electrode and receives a second pixel voltage from the TFT layer. The first and second storage wirings are formed in the unit pixel area and respectively serve to maintain the first and second pixel voltages during an image frame. The storage duplication wiring is formed along edges of the unit pixel area and is electrically connected to each of the first and second storage wirings.

In one exemplary embodiment, the TFT layer may include first and second gate wirings disposed in a long direction of the first and second storage wirings, respectively, a data wiring crossing the first and second gate wirings, and first and second TFTs. The first TFT applies the first pixel voltage from the data wiring to the first sub electrode in response to a first control signal applied by the first gate wiring, and the second TFT applies the second pixel voltage from the data wiring to the second sub electrode in response to a second control signal applied by the second gate wiring. The unit pixel area is formed in a zigzag shape and in directions that cross the first and second wirings, respectively. The storage duplication wiring extends along a space between the first sub electrode of the unit pixel area and the second sub electrode of a unit pixel area adjacent to the unit pixel area.

In another exemplary embodiment, the TFT layer may include a gate wiring disposed in a long direction of the first and second storage wirings, first and second wirings crossing the gate wiring, and first and second TFTs. The first TFT applies the first pixel voltage from the first data wiring to the first sub electrode in response to the control signal applied by the gate wiring. The second TFT applies the second pixel voltage from the second data wiring to the second sub electrode in response to the control signal applied by the gate wiring. The unit pixel area is formed in a rectangular shape. The unit pixel area includes an effective light-transmission area within which the first and second sub electrodes are disposed, and a non-effective light-transmission area surrounding the effective light-transmission area and disposed along the gate wiring and the first and second data wiring.

In another exemplary embodiment, a display panel includes a first substrate, a second substrate, and a layer of a liquid crystal material disposed between the first and second substrates. The first substrate includes a lower substrate, a pixel electrode, a plurality of storage wirings and a storage duplication wiring. The pixel electrode is patterned in the shape of a unit pixel area on the lower substrate and includes first and second sub electrodes that are electrically separated from each other and that respectively receive voltages of different levels. A plurality of storage wirings is formed in the unit pixel area and serve to maintains the voltages. The storage duplication wiring is formed along edges of the unit pixel area and is respectively electrically connected to the storage wirings, and the storage wirings are disposed adjacent to the storage duplication wiring. The second substrate includes an upper substrate facing the lower substrate, color filters, a light blocking pattern, and a common electrode. Each of the color filters is formed in a shape corresponding to an associated one of the unit pixel areas and is disposed on the upper substrate. The light blocking pattern is formed in an area corresponding to a boundary area between the unit pixel areas. The common electrode is formed on the color filters and the light blocking pattern.

In another exemplary embodiment, the light blocking pattern may cover the storage duplication wiring corresponding to the boundary area between the unit pixel areas. The boundary area is formed in a zigzag shape and extends in a direction crossing the storage wirings. A domain divisional pattern is formed at the common electrode, and the domain divisional pattern serves to divide the first and second sub electrodes into a plurality of domains.

The novel display substrates disclosed herein enable the number of pixel defects that occur in the substrates to be decreased so that the image quality of display panels incorporating the substrates is thereby improved.

A better understanding of the above and many other features and advantages of the novel display panel substrates of the present invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
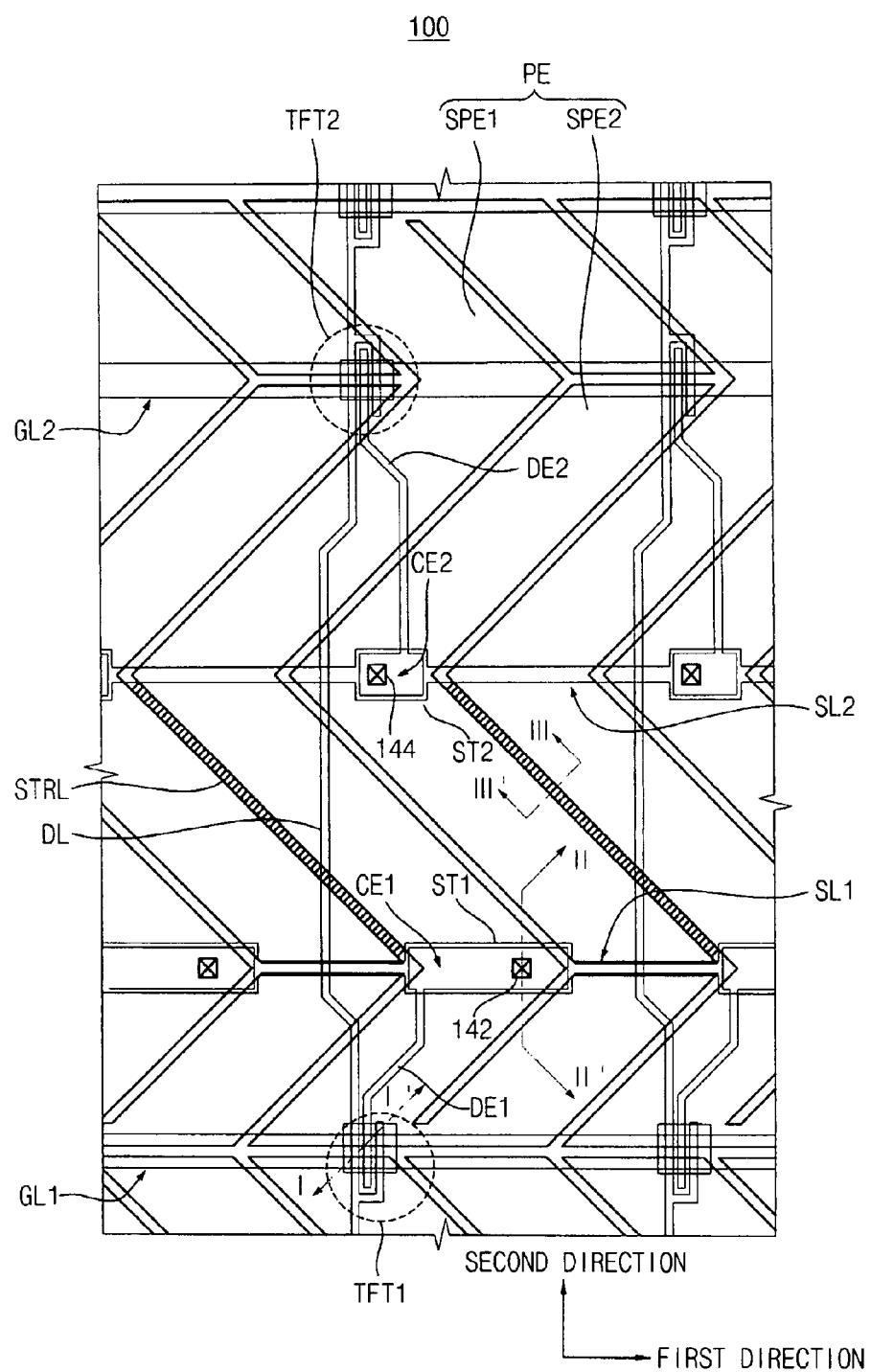
FIG. 1 is a partial plan view of a first exemplary embodiment of a display substrate in accordance with the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to nonimplanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

DISPLAY SUBSTRATE EXAMPLE

Figure 2:
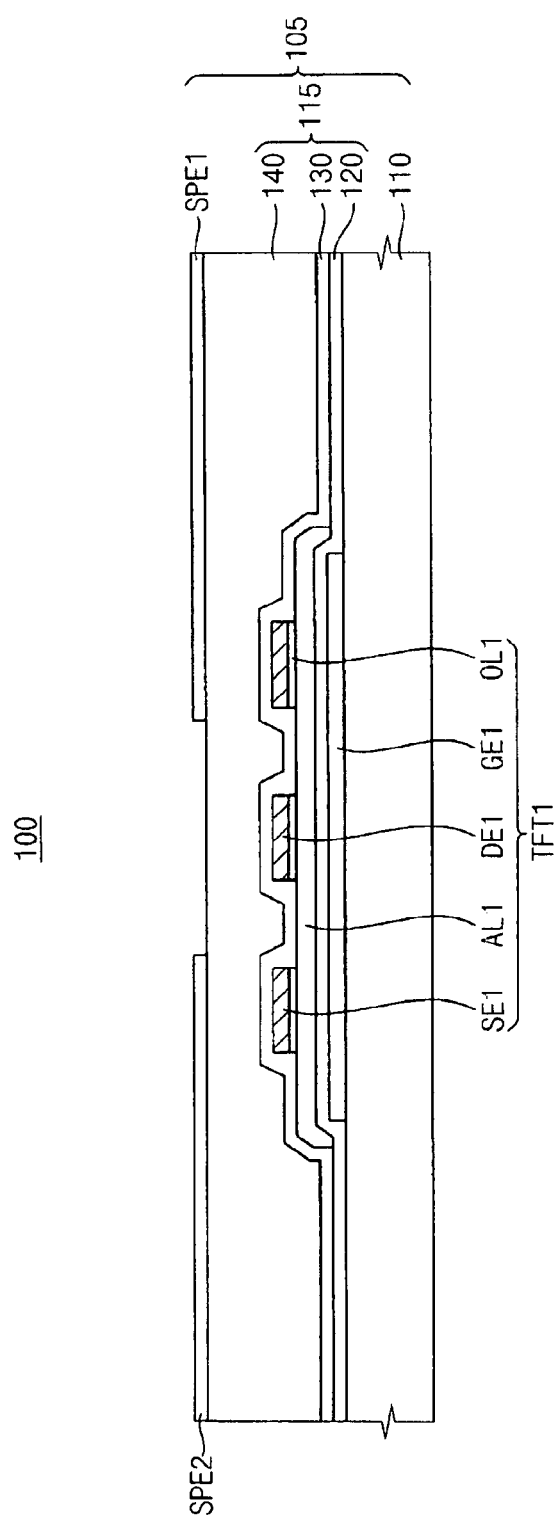
FIG. 2 is a partial cross-sectional view of the display substrate of FIG. 1 as seen along the lines of the section I-I' taken therein.

FIG. 1 is a partial plan view of a first exemplary embodiment of a liquid crystal display substrate 105 in accordance with the present invention, and FIG. 2 is a partial cross-sectional view of the exemplary display substrate of FIG. 1 as seen along the lines of the section I-I' taken therein.

Referring to FIGS. 1 and 2, a display substrate 100 includes a substrate 105, a pixel electrode PE, a first storage wiring SL1, a second storage wiring SL2 and a storage duplication wiring STRL.

The substrate 105 includes a base substrate 110 and a thin film transistor (TFT) layer 115 formed on the base substrate 110.

The base substrate 110 comprises an optically isotropic glass. The TFT layer 115 applies a pixel voltage to a pixel electrode PE in response to a control signal and an image information signal supplied from an external device.

A plurality of unit pixel areas is defined on the TFT layer 115. The unit pixel areas are disposed in a regular arrangement, such as in a matrix shape, a mosaic shape or the like.

The TFT layer 115 includes a plurality of gate wirings GL1 and GL2, a plurality of data wirings DL and a plurality of TFTs. The gate wirings GL1 and GL2 extend in a first direction on the base substrate 110, as indicated by the arrow coordinates in FIG. 1. The data wirings DL are electrically insulated from the gate wirings GL1 and GL2 and are disposed on an area of the base substrate 110 corresponding to the gate wirings GL1 and GL2. The data wirings DL extend in a second direction crossing the first direction, as indicated by the arrow coordinates of FIG. 1. The second direction may be substantially perpendicular to the first direction. The TFTs are disposed along respective ones of the gate wirings GL1 and GL2 or the data wirings DL, and each is electrically connected to associated ones of the gate wirings GL1 and GL2 and the data wirings DL. Each of the TFTs outputs a pixel voltage applied through the associated data wiring DL in response to a control signal applied through the associated gate wiring.

In FIGS. 1 and 2, two of the gate wirings GL1 and GL2 and one of the data wirings DL define one unit pixel area. Accordingly, the TFT layer 115 is described in reference to the unit pixel area so defined. Two of the gate wirings GL1 and GL2 of the unit pixel area are defined as a first gate wiring GL1 and a second gate wiring GL2, respectively. A TFT electrically connected to the first gate wiring GL1 is defined as a first thin film transistor TFT1, and a TFT electrically connected to the second gate wiring GL2 is defined as a second thin film transistor TFT2. The layered structures of the first and second transistors TFT1 and TFT2 are substantially the same, so that the TFT layer 115 is discussed with reference to the first thin film transistor TFT1 illustrated in FIGS. 1 and 2.

As illustrated in FIG. 2, the first thin film transistor TFT1 includes a first gate electrode GE1, a gate insulation layer 120, a first active layer AL1, a first ohmic contact layer OL1, a first source electrode SE1 and a first drain electrode DE1.

The first gate electrode GE1 comprises a portion of the first gate wiring GL1. The gate insulation layer 120 is formed on an area of the base substrate 110 corresponding to the first and second gate wirings GL1 and GL2. The first active layer AL1 may, for example, include a semiconductor, such as amorphous silicon, and may be formed on an area of the gate insulation layer 120 corresponding to the first gate electrode GE1. The first source electrode SE1 comprises a portion of the data wiring DL overlapping the first active layer AL1. The first source electrode SE1 may be formed, for example, in substantially a U-shape. The first drain electrode DE1 is formed from substantially the same layer, i.e., of the same material and in the same layer, as the first source electrode SE1, and is separated from the first source electrode SE1. The first drain electrode DE1 may be disposed, for example, in a middle area of the U-shaped first source electrode SE1. The first drain electrode DE1 thereby partially overlaps the first active layer AL1, and extends in the second direction. The first ohmic contact layer OL1 may comprise, for example, amorphous silicon implanted as n-type, and is respectively formed between the first active layer AL1 and the first source electrode SE1, and between the first active layer AL1 and the first drain electrode DE1.

The TFT layer 115 may further include a passivation layer 130 and an organic insulation layer 140. The passivation layer 130 is formed on an area of the gate insulation layer 120 corresponding to the first thin film transistor TFT1, the second thin film transistor TFT2 and the data wiring DL. The organic insulation layer 140 is formed on the passivation layer 130, and serves to planarize the surface of the TFT layer 115. Optionally, one of the passivation layer 130 and the organic insulation layer 140 may be omitted.

The pixel electrode PE is formed in the unit pixel area on the organic insulation layer 140, and is patterned in the shape of the unit pixel area. In FIGS. 1 and 2, the unit pixel area is formed in zigzag shape and in a direction crossing the first and second gate wiring GL1 and GL2, as illustrated in FIG. 1. For example, the unit pixel area may cross the gate wiring in the second direction. In the particular exemplary embodiment illustrated in FIG. 1, the unit pixel area includes three bends in the second direction, and accordingly, is substantially W-shaped.

The pixel electrode includes a first sub electrode SPE1 and a second sub electrode SPE2 that are electrically separated from each other. The first sub electrode SPE1 is formed in the first direction along sides of the unit pixel area and is substantially W-shaped. The second sub electrode SPE2 is formed in the first direction along the remaining sides of the unit pixel area and is formed along a middle area of the first sub electrode SPE1. The second sub electrode SPE2 may be substantially Λ-shaped. End portions of the first sub electrode SPE1 extending in the second direction are bent in an opposite direction and face end portions of the first sub electrode SPE1, respectively.

The pixel electrode PE includes a transparent, electrically conductive material, such as indium tin oxide (ITO), indium zinc oxide (IZO), amorphous indium tin oxide (a-ITO), or the like.

Figure 3:
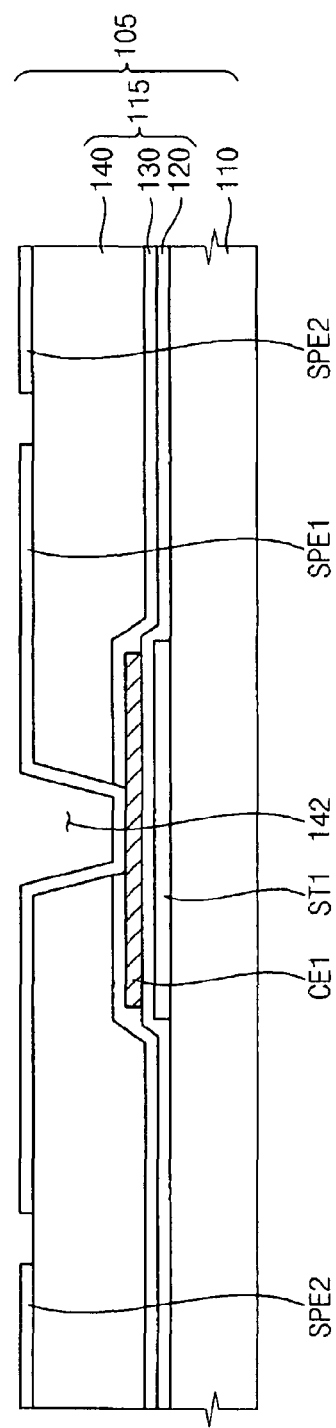
FIG. 3 is a partial cross-sectional view of the display substrate of FIG. 1 as seen along the lines of the section II-II' taken therein.

FIG. 3 is a partial cross-sectional view of the exemplary display substrate of FIG. 1 as seen along the lines of the section II-II' taken therein. Referring to FIGS. 1 to 3, the first drain electrode DE1 of the first thin film transistor TFT1 extends in the second direction, as described above, and is electrically connected to a first connecting electrode CE1 formed from substantially the same layer as the first drain electrode. The first connecting electrode CE1 is disposed in a curved portion of the first sub electrode SPE1. The first connecting electrode CE1 is electrically connected to the first sub electrode SPE1 through the first contact hole 142, and the first thin film transistor TFT1 is thereby electrically connected to the first sub electrode SPE1. A first control signal is applied to the first gate electrode GE1 by the first gate wiring GL1, and a first pixel voltage is applied to the first source electrode SE1 by the data wiring DL. The first thin film transistor TFT1 thus applies the first pixel voltage to the first sub electrode SPE1 through the first drain electrode DE1 in response to the application thereto of the first control signal.

A second drain electrode DE2 of the second thin film transistor TFT2 extends in the second direction, and is electrically connected to a second connecting electrode CE2 formed from substantially the same layer as the second drain electrode DE2. The second connecting electrode CE2 is disposed in a middle portion of the second sub electrode SPE2. The second connecting electrode CE2 is electrically connected to the second sub electrode SPE2 through the second contact hole 144, and the second thin film transistor TFT2 is thereby electrically connected to the second sub electrode SPE2. A second control signal is applied to the second gate electrode by the second gate wiring GL3, and a second pixel voltage is applied to the second source electrode by the data wiring DL. The second thin film transistor TFT2 thus applies the second pixel voltage to the second sub electrode SPE2 through the second drain electrode DE2 in response to the application thereto of the second control signal.

In the embodiment of FIGS. 1 to 3, the level of the second pixel voltage is greater than that of the first pixel voltage. Accordingly, the first sub electrode SPE1 may be referred to as a "low pixel," and the second sub electrode SPE2 may be referred to as a "high pixel".

The first and second storage wirings SL1 and SL2 both extend in the first direction substantially parallel to the first and second gate wirings GL1 and GL2. The first and second storage wirings SL1 and SL2 are formed from substantially the same layer as the first and second gate wirings GL1 and GL2, and are disposed between the first gate wiring GL1 and the second gate wiring GL2. In the embodiment illustrated, the first and second storage wirings SL1 and SL2 are formed in the unit pixel area and to have a double storage wiring structure.

The second storage wiring SL2 is disposed in an area corresponding to a middle of a curved portion of the unit pixel area, and the first storage wiring SL1 is disposed in an area corresponding to the remaining curved portion of the unit pixel area.

The first storage wiring SL1 includes a first storage electrode ST1 having a greater width in an area corresponding to the first connecting electrode CE1. The second storage wiring SL2 includes a second storage electrode ST2 having a greater width in an area corresponding to the second connecting electrode CE2.

The first storage electrode ST1, the gate insulation layer 120 and the first connecting electrode CE1 together form a first capacitor that is operative to maintain the first pixel voltage applied to the first sub electrode SPE1 during an image frame. The second storage electrode ST2, the gate insulation layer 120 and the second connecting electrode CE2 together form a second capacitor that is operative to maintain the second pixel voltage applied to the second sub electrode SPE2 during that frame. An external device (not illustrated) applies a maintaining voltage to the first and second storage wirings SL1 and SL2.

Figure 4:
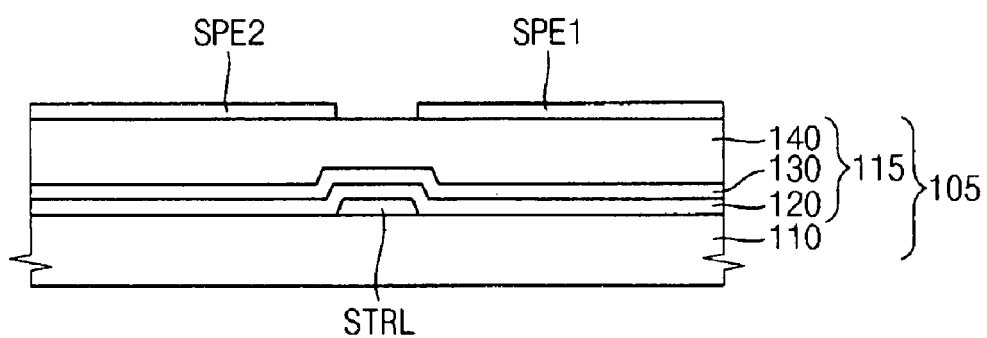
FIG. 4 is a partial cross-sectional view of the display substrate of FIG. 1 as seen along the lines of the section III-III' taken therein.

FIG. 4 is a partial cross-sectional view of the exemplary display substrate of FIG. 1 as seen along the lines of the section III-III' taken therein. Referring to FIG. 4, the storage duplication wiring STRL is electrically connected to both the first storage wiring SL1 and the second storage wiring SL2. The storage duplication wiring STRL is formed along edges of the unit pixel area, and is formed from substantially the same layer as the first and second gate wirings GL1 and GL2. In order to prevent a decrease in the light transmission area of the unit pixel area, the storage duplication wiring STRL is formed in an area between the first sub electrode SPE1 and the second sub electrode SPE2.

The storage duplication wiring STRL is disposed between the first sub electrode SPE1 of one unit pixel area and the second sub electrode SPE2 of a unit pixel area adjacent to the one unit pixel area. In FIGS. 1 to 4, the storage duplication wiring STRL is extended along one branch of the substantial Λ-shaped second sub electrode SPE2. The double storage wirings of the display substrate 100 are thereby electronically connected to each other by the storage duplication wiring in each of the corners of the unit pixel area.

As will be appreciated by those of skill in the art, even though any point of the first storage wiring SL1 is disconnected, the maintaining voltage will still applied to the first storage wiring SL1 through the second storage wiring SL2 and the storage duplication wiring STRL, and even though any point of the second storage wiring SL2 is disconnected, the maintaining voltage will still be applied to the second storage wiring SL2 in a similar manner. Ordinarily, a disconnection of the first and second storage wirings SL1 and SL2 will interrupt the application of the maintaining voltage, and the first and second pixel voltages therefore will not be maintained during the frame, thereby resulting in a pixel defect. However, the double storage wiring structure of the exemplary display panel substrate described above prevents such pixel defects from occurring in a display panel incorporating the substrate.

Moreover, as illustrated in FIG. 1, the first and second storage wirings SL1 and SL2 cross the data wiring DL, so that a short circuit can occur between the first and second storage wirings SL and the data wiring DL. However, when such a short-circuit with the data wiring DL occurs, the short-circuit can be readily repaired by simply cutting the first storage wiring SL1 or the second storage wiring SL2 disposed at both sides of the data wiring DL. And, as discussed above, although a portion of the first storage wiring SL1 or the second storage wiring SL2 is then cut, the maintaining voltage will still be applied to the first storage wiring SL1 and the second storage wiring SL2 through the storage duplication wiring STRL.

In the exemplary embodiment of FIGS. 1 to 4, the storage duplication wiring STRL is formed from substantially the same layer as the first and second gate wirings GL1 and GL2, as with the first and second storage wirings SL1 and SL2. However, in another possible embodiment, the storage duplication wiring STRL may instead be formed in an upper portion of the gate insulation layer 120, for example, between the gate insulation layer 120 and the passivation layer 140, unlike the first and second storage wirings SL1 and SL2. When the storage duplication wiring STRL is formed between the gate insulation layer 120 and the passivation layer 140, an opening is formed in an area of the gate insulation layer 120 on the first and second storage wirings SL1 and SL2 between the first sub electrode SPE1 and the second sub electrode SPE2, and the storage duplication wiring STRL may then be electrically connected to the first and second storage wirings SL1 and SL2 through the opening.

Figure 5:
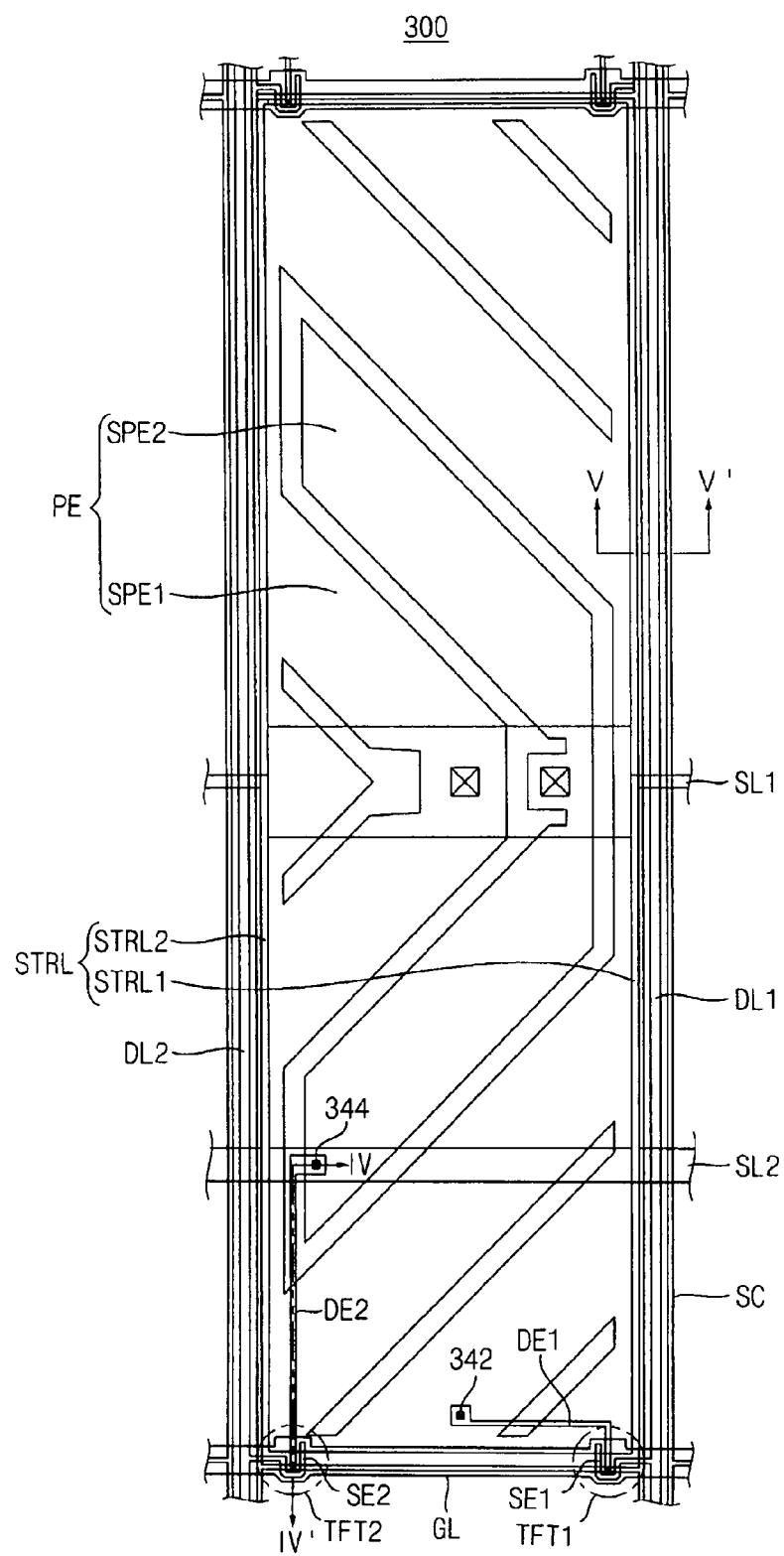
FIG. 5 is a partial plan view of a second exemplary embodiment of a display substrate in accordance with the present invention.
Figure 6:
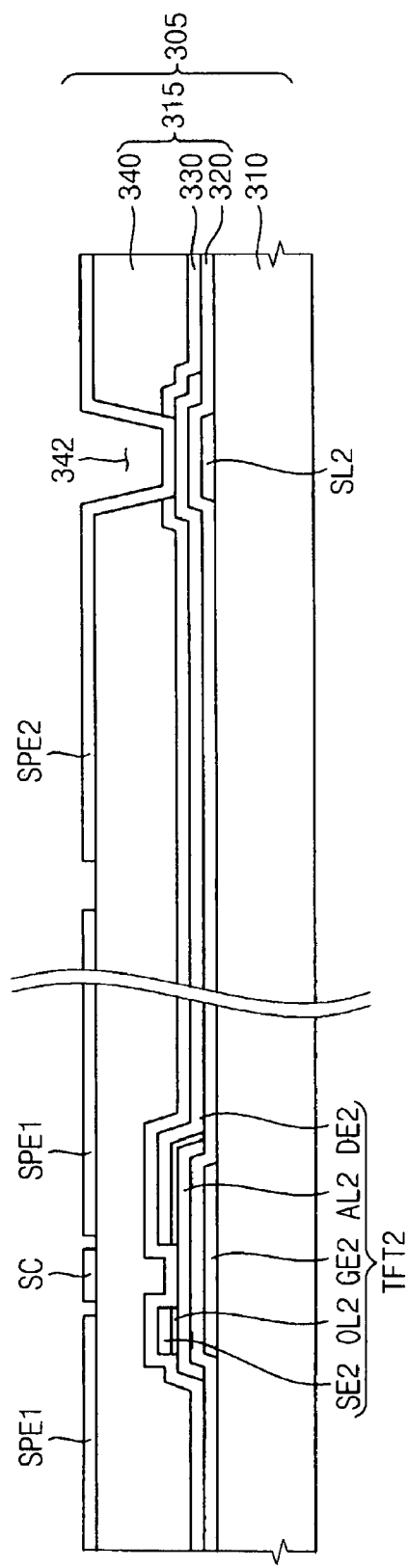
FIG. 6 is a partial cross-sectional view of the display substrate of FIG. 5 as seen along the lines of the section VI-VI' taken therein.

FIG. 5 is a partial plan view of a second exemplary embodiment of a display substrate 300 in accordance with the present invention, and FIG. 6 is a partial cross-sectional view of the exemplary display substrate of FIG. 5 as seen along the lines of the section VI-VI' taken therein.

Referring to FIGS. 5 and 6, the display substrate 300 includes a substrate 305, a pixel electrode PE, a first storage wiring SL1, a second storage wiring SL2, and a storage duplication wiring STRL.

The substrate 305 includes a base substrate 310 and a TFT layer 315 formed on the base substrate 310. The substrate 305 is substantially the same as the substrate 105 of FIGS. 1 to 4, except for the TFT layer 315. The TFT layer 315 is substantially the same as the TFT layer 115 of FIGS. 1 to 4, except for the number of gate wirings and data wirings linked to the unit pixel area.

The TFT layer 315 includes a plurality of gate wirings GL, a plurality of data wirings DL1 and DL2, and a plurality of thin film transistors TFT1 and TFT2. In FIGS. 5 and 6, one of the gate wirings GL and two of the data wirings DL1 and DL2 define each of the unit pixel areas. Accordingly, the TFT layer 315 is discussed in reference to the unit pixel area so defined. The two data wirings DL1 and DL2 defining the unit pixel area include a first data wiring DL1 and a second data wiring DL2, respectively. A TFT electrically connected to the first data wiring DL1 includes a first thin film transistor TFT1, and a TFT electrically connected to the second data wiring DL2 is defined as a second thin film transistor TFT2.

The layered structure of the first and second thin film transistors TFT1 and TFT2 is substantially the same as the first thin film transistor TFT1 of FIG. 2. Accordingly, the second thin film transistor TFT2 includes a second gate electrode GE2, a gate insulation layer 320, a second active layer AL2, a second ohmic contact layer OL2, a second source electrode SE2, and a second drain electrode DE2. The first thin film transistor TFT1 includes substantially the same or similar elements corresponding to those of the second thin film transistor TFT2.

A pixel electrode PE is formed on the unit pixel area defined on an organic insulation layer 340, and is patterned along the unit pixel area. In the exemplary embodiment illustrated in FIGS. 5 and 6, the unit pixel area is formed in a rectangular shape.

As illustrated in FIG. 5, the gate wiring GL is formed along one short side of the unit pixel area, and the first and second data wirings DL1 and DL2 are formed along respective ones of the long sides of the unit pixel area. The unit pixel area includes an effective light-transmission area and a non-effective light-transmission area. The effective light-transmission area is smaller than the unit pixel area, and respective sides of the effective light-transmission area are separated from the short sides and long sides of the unit pixel area. The non-effective light-transmission area is defined as the areas between the gate wiring GL and the effective light-transmission area, and between the first and second data wirings DL1 and DL2 and the effective light-transmission area, respectively.

The pixel electrode includes a first sub electrode SPE1 and a second sub electrode SPE2. The second sub electrode is substantially V-shaped, and is disposed in a middle area of the effective light-transmission area. The first sub electrode SPE1 is separated from the second sub electrode SPE2, and is disposed in the remaining area of the effective light-transmission area so as to surround the second sub electrode SPE2.

A first drain electrode DE1 of the first thin film transistor TFT1 is electrically connected to the first sub electrode SPE1 through a first contact hole 342, and the first thin film transistor TFT1 thereby applies a first pixel voltage supplied through the first data wiring DL1 to the first sub electrode SPE1 in response to a control signal applied to TFT1 through the gate wiring GL.

A second drain electrode DE2 of the second thin film transistor TFT2 is electrically connected to the second sub electrode SPE2 through a second contact hole 344, and the second thin film transistor TFT2 thereby applies a second pixel voltage supplied through the second data wiring DL2 to the second sub electrode SPE2 in response to a control signal applied to TFT2 through the gate wiring GL.

The first and second storage wirings SL1 and SL2 both extend across one unit pixel area in a first direction and substantially parallel to the gate wirings GL. The first and second storage wirings SL1 and SL2 are formed from substantially the same layer as the gate wirings GL. In FIGS. 5 and 6, the first and second storage wirings SL1 and SL2 are formed in the unit pixel area, and form a double storage wiring structure. In operation, an external device (not illustrated) applies a maintaining voltage of a selected level to the first and second storage wirings SL1 and SL2.

Figure 7:
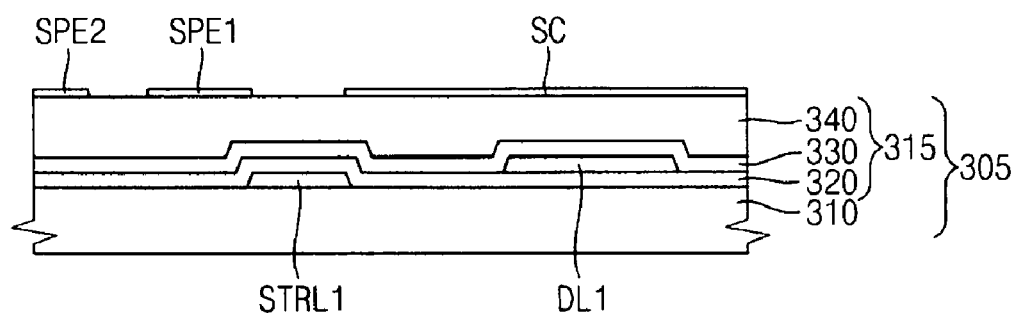
FIG. 7 is a partial cross-sectional view of the display substrate of FIG. 5 as seen along the lines of the section V-V' taken therein.

FIG. 7 is a partial cross-sectional view of the display substrate of FIG. 5 as seen along the lines of the section V-V' taken therein. Referring to FIGS. 5 and 7, the storage duplication wiring STRL is electrically connected to both the first storage wiring SL1 and the second storage wiring SL2. The storage duplication wiring STRL is formed along edges of the unit pixel area, and is formed from substantially the same layer as the gate wiring GL.

The storage duplication wiring STRL includes a first repair wiring STRL1 and a second repair wiring STRL2. The first and second repair wirings STRL1 and STRL2 are disposed in the non-effective light-transmission area to prevent a decrease in the amount of light transmitted through the unit pixel area. Thus, the first repair wiring STRL1 is disposed in the non-effective light-transmission area along the first data wiring DL1, and the second repair wiring STRL2 is disposed in the non-effective light-transmission area along the second data wiring DL2.

The first and second repair wirings STRL1 and STRL2 thus serve to electrically connect the double storage wirings of the display substrate 300 to each other within each of the corners of the unit pixel area.

DISPLAY PANEL EXAMPLE

Figure 8:
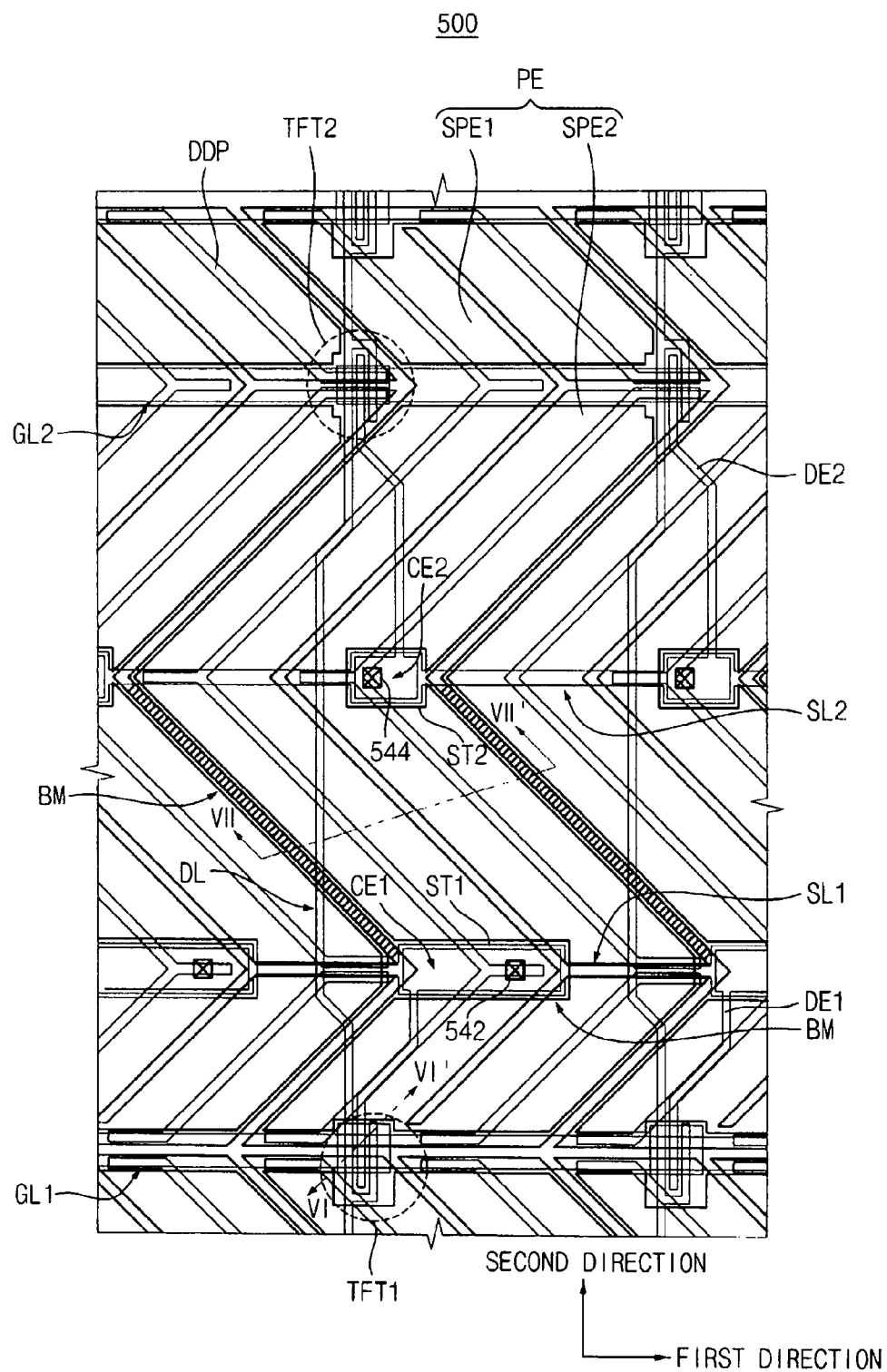
FIG. 8 is a partial plan view of a first exemplary embodiment of a display panel in accordance with the present invention.
Figure 9:
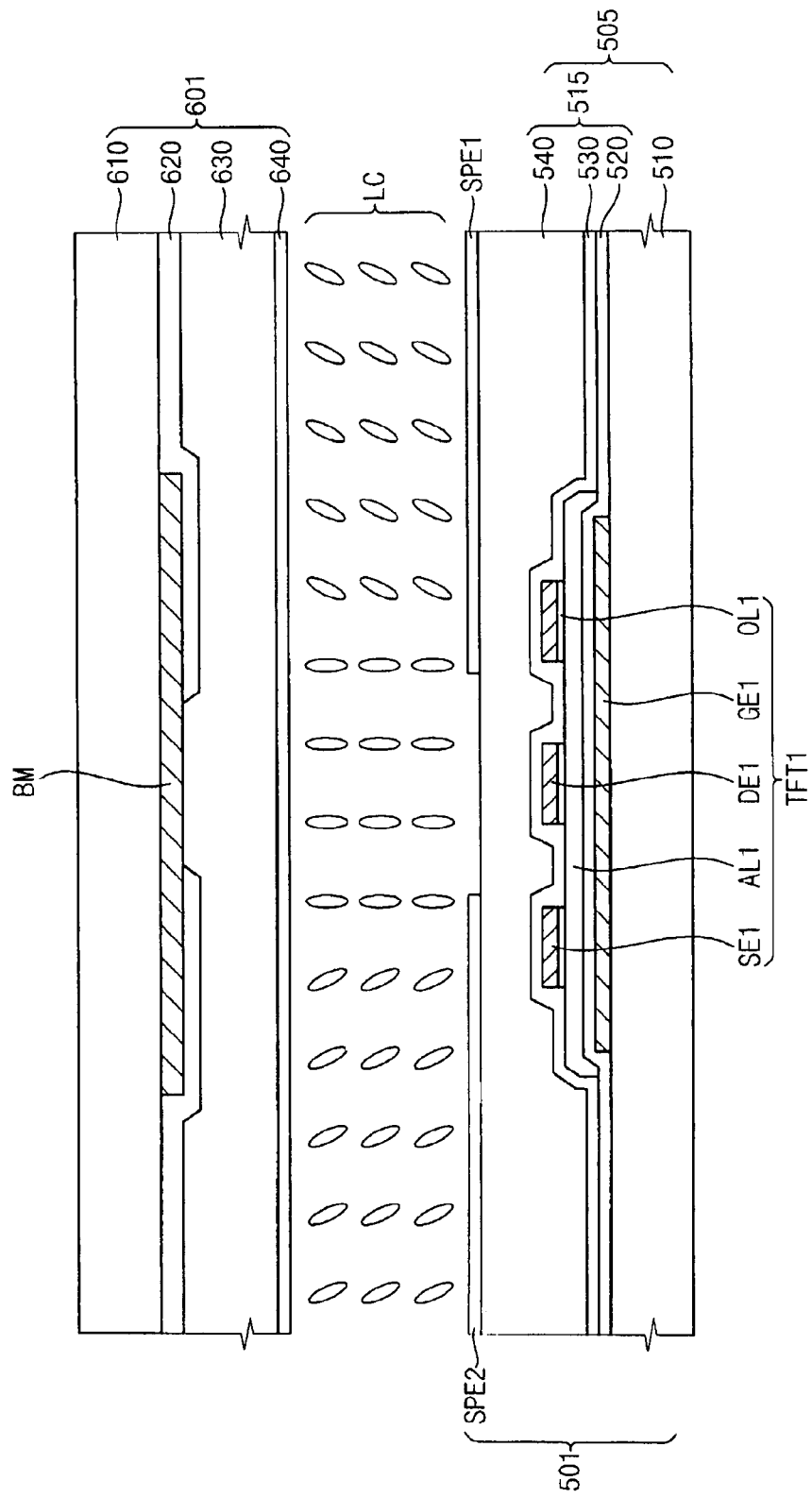
FIG. 9 is a partial cross-sectional view of the display panel of FIG. 8 as seen along the lines of the section VI-VI' taken therein.

FIG. 8 is a partial plan view of a first exemplary embodiment of a display panel 500 in accordance with the present invention, and FIG. 9 is a partial cross-sectional view of the exemplary display panel of FIG. 8 as seen along the lines of the section VI-VI' taken therein. Referring to FIGS. 8 and 9, the exemplary display panel 500 includes a first substrate 501, a second substrate 601 and a liquid crystal layer LC.

The first substrate 501 is substantially the same as the display substrate 100 of FIGS. 1 to 4. The first substrate 501 thus includes a lower substrate 510, a pixel electrode PE, a plurality of storage wirings SL1, SL2 and a storage duplication wiring STRL. The lower substrate 510 corresponds to the substrate 110 of FIGS. 1 to 4.

A TFT layer 715 is formed on the lower substrate 510. The TFT layer 715 is substantially the same as the TFT layer 115 of FIGS. 1 to 4. Thus, the TFT layer 715 includes a plurality of gate wirings GL1 and GL2, a plurality of data wirings DL, and a plurality of thin film transistors TFT1 and TFT2.

As above, the following description of the embodiment of FIGS. 8 and 9 is made with reference to a unit pixel area. The first gate wiring GL1, the second gate wiring GL2 and the data wiring DL together define the unit pixel area. The unit pixel area is formed in a zigzag shape and in a direction crossing the first and second gate wirings GL1 and GL2.

A pixel electrode PE is formed in the unit pixel area, and includes a first sub electrode SPE1 and a second sub electrode SPE2 patterned in the shape of the unit pixel area. A first thin film transistor TFT1 electrically connected to the first gate wiring GL1 applies a first pixel voltage to the first sub electrode SPE1. A second thin film transistor TFT2 electrically connected to the second gate wiring GL2 applies a second pixel voltage to the second sub electrode SPE2.

The first storage wiring SL1 and the second storage wiring SL2 are disposed between the first gate wiring GL1 and the second gate wiring GL2, and are formed from substantially the same layer as the first and second gate wirings GL1 and GL2. The first and second storage wirings SL1 and SL2 are formed across the unit pixel area. The storage duplication wiring STRL is formed at corners of the unit pixel area. For example, the storage duplication wiring STRL may be formed between a first sub electrode SPE1 formed in one unit pixel area and a second sub electrode SPE2 formed in another unit pixel area adjacent to the one unit pixel area. The storage duplication wiring STRL is formed from substantially the same layer as the first and second gate wirings GL1 and GL2 and the first and second storage wirings SL1 and SL2. The storage duplication wiring STRL is electrically connected to the first storage wiring SL1 and the second storage wiring SL2.

Figure 10:
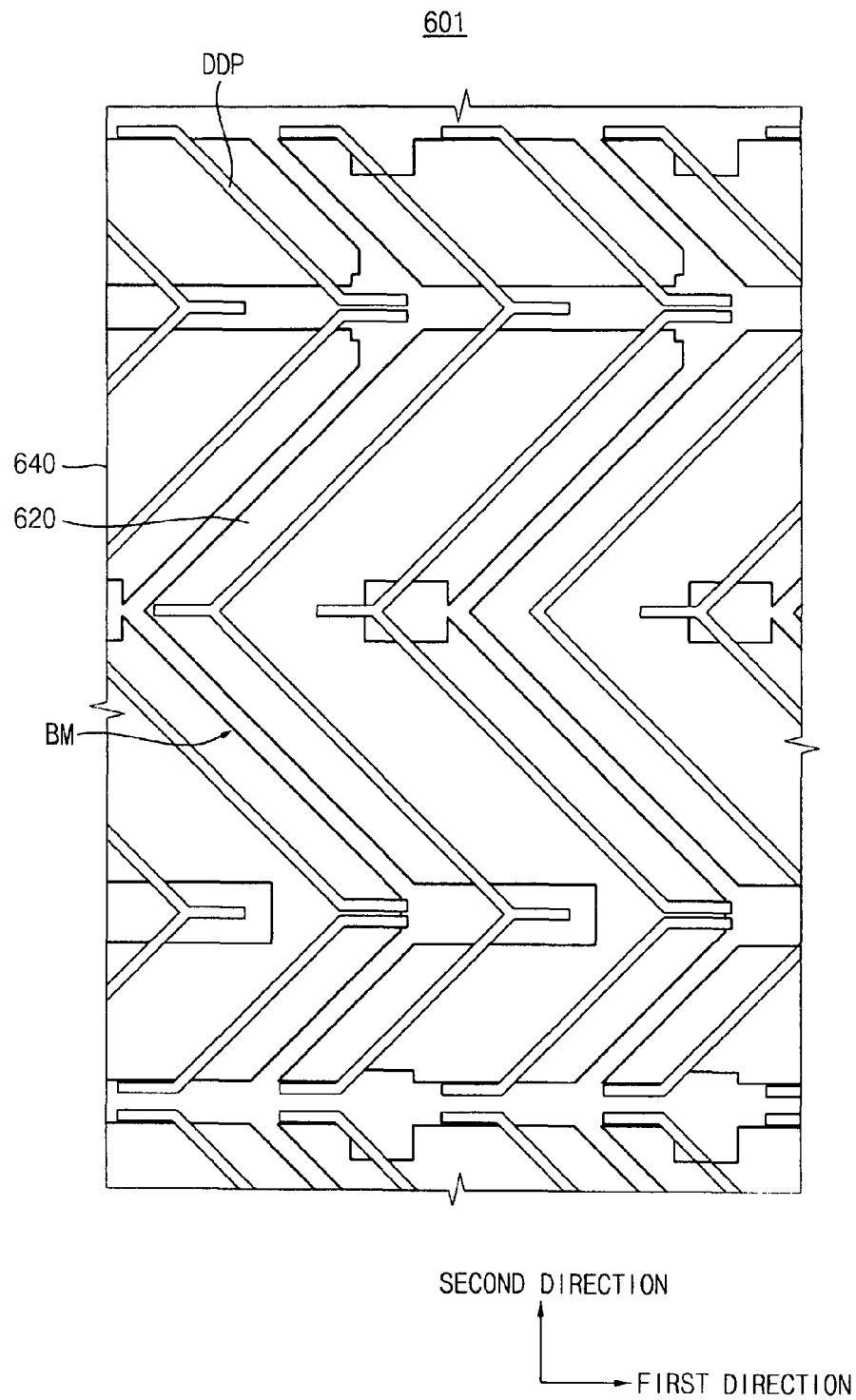
FIG. 10 is a plan view of an exemplary second substrate of the display panel of FIG. 8.

FIG. 10 is a plan view of an exemplary second substrate 601 of the display panel 500 of FIG. 8. Referring to FIGS. 9 and 10, the second substrate 601 includes an upper substrate 610 facing the lower substrate 510, color filters 620, a light blocking pattern or "black matrix" BM, and a common electrode 640.

The light blocking pattern BM is formed at one surface of the upper substrate 610 facing the lower substrate 510. The light blocking pattern BM is formed in a boundary area between the unit pixel areas, the first and second thin film transistors TFT1 and TFT2, the first and second gate wirings GL1 and GL2 and the data wiring DL. The light blocking pattern BM may comprise an organic material or an inorganic material, such as chrome.

Each of the color filters 620 is formed in an opening of and so as to partially overlap the light blocking pattern BM. The color filters 620 may comprise, for example, red, green and blue (RGB) color filters. The color filters are arranged in a particular arrangement of elements, such as adjacent stripes or a mosaic type of arrangement.

The second substrate 601 may further include an over-coating layer 630. The over-coating layer 630 covers and protects the color filters 620 and the light blocking pattern BM, and also serves to planarize the surface of the second substrate 601. The over-coating layer 630 may comprise a transparent organic material.

Figure 11:
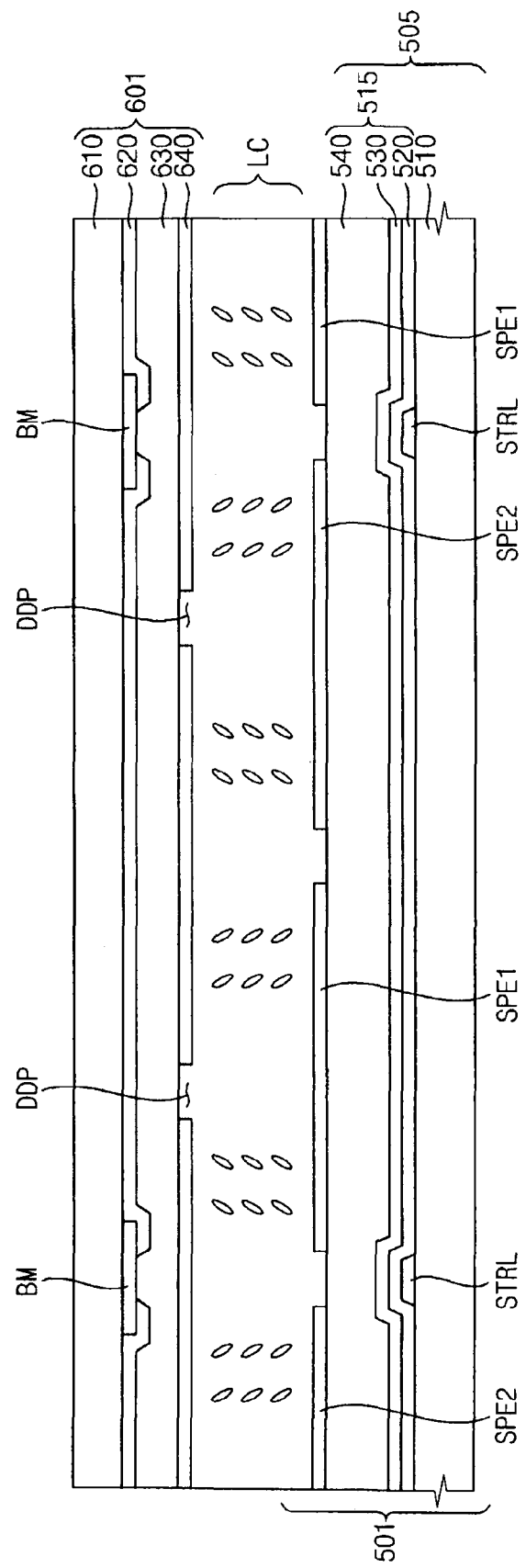
FIG. 11 is a partial cross-sectional view of the display panel of FIG. 8 as seen along the lines of the section VII-VII' taken therein; and, FIG. 12 is a partial cross-sectional view of another exemplary embodiment of a display panel in accordance with the present invention.

FIG. 11 is a partial cross-sectional view of the display panel 500 of FIG. 8 as seen along the lines of the section VII-VII' taken therein. Referring to FIGS. 8 to 11, the common electrode 640 includes substantially the same material as the pixel electrode PE, and is formed on the over-coating layer 630. The common electrode 640 may further include a domain divisional pattern DDP. The unit pixel area is divided into a plurality of domains by the domain divisional pattern DDP. Each of the domains is defined as an area formed by boundaries at which liquid crystals are arranged in various specific directions.

In FIGS. 8 to 11, the domain divisional pattern DDP includes an opening pattern formed by removing a portion of the common electrode 640. In an alternative embodiment, the domain divisional pattern DDP may comprise a protrusion pattern formed on the common electrode 640.

The domain divisional pattern DDP is formed in zigzag shape and in a second direction that is substantially perpendicular to the first direction, in the same manner as the first sub electrode SPE1 and the second sub electrode SPE2. The domain divisional pattern DDP may have a zigzag-shape in the second direction, and the curved points of the zigzag-shape of the domain divisional pattern DDP may correspond to centers of the first sub electrode SPE1 in the first direction and to the second sub electrode SPE2, respectively.

The storage duplication wiring STRL is formed in a boundary area between the unit pixel areas, and is formed from substantially the same layer as the first and second storage wirings SL1 and SL2. The storage duplication layer STRL is disposed between a first sub electrode SPE1 formed in one unit pixel area and a second sub electrode SPE2 formed in another unit pixel area adjacent to the one unit pixel area. The storage duplication layer STRL is electrically connected to both the first storage wiring SL1 and the second storage wiring SL2.

The storage duplication wiring STRL is covered by the light blocking pattern BM formed on the second substrate 601 to prevent a decrease in the opening ratio of the display panel 500.

A layer of a liquid crystal material LC is disposed between the first substrate 501 and the second substrate 601, as illustrated in FIGS. 10 and 11. The molecules of the liquid crystal layer are arranged in various specific directions in the adjacent domains so as to increase the viewing angle of the unit pixel area.

Figure 12:
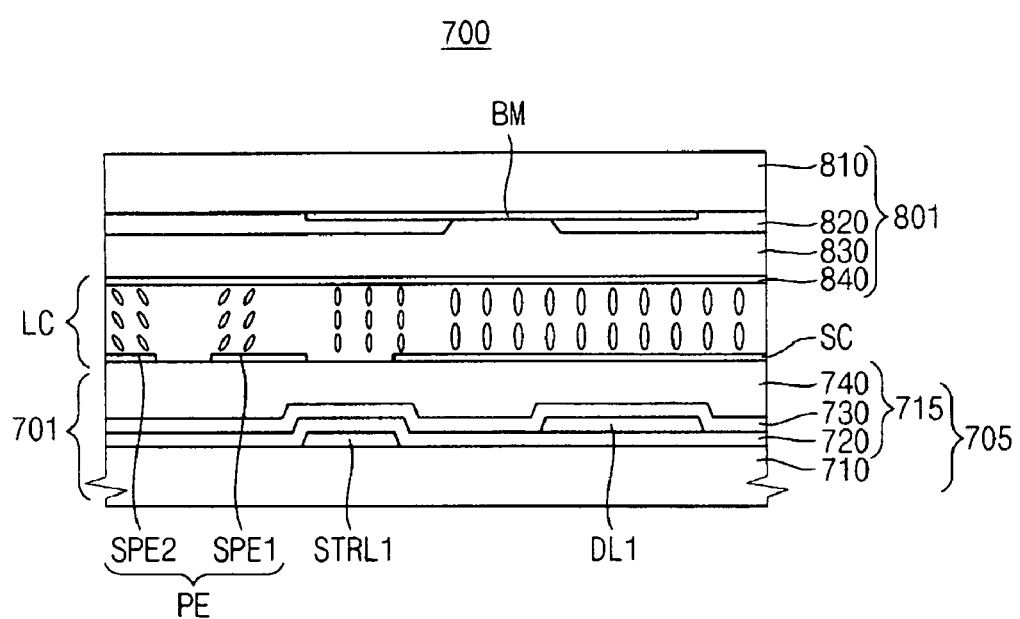

FIG. 12 is a partial cross-sectional view of another exemplary embodiment of a display panel 700 in accordance with the present invention. Referring to FIG. 12, the second exemplary display panel 700 includes a first substrate 701, a second substrate 801 and a liquid crystal layer LC.

The first substrate 701 is substantially the same as the first substrate 501 illustrated in FIGS. 5 to 7. The first substrate 701 thus includes a lower substrate 701 having a TFT layer 715, a pixel electrode PE disposed in a unit pixel area on the TFT layer 715, a plurality of storage wirings, and a plurality of storage duplication wirings.

With reference to the unit pixel area thereof, the TFT layer 715 of the first substrate 701 includes a gate wiring extending in a first direction, first and second data wirings DL1 and DL2 extending in a second direction crossing the first direction, a first TFT electrically connected to the first data wiring DL1, and a second TFT electrically connected to the second data wiring DL2.

The unit pixel area is formed in a rectangular shape. The pixel electrode PE includes a first sub electrode SPE1 and a second sub electrode SPE2 formed separately from each other in the pixel area. The second sub electrode SPE2 is substantially V-shaped and is disposed at a center of the unit pixel area, and the first sub electrode SPE1 is disposed in the remaining area of the unit pixel area so as to surround the second sub electrode SPE2.

The first TFT applies a first pixel voltage to the first sub electrode SPE1, and the second TFT applies a second pixel voltage to the second sub electrode SPE2 in response to a control signal respectively applied thereto by the gate wiring.

The first and second storage wirings are formed from substantially the same layer as the gate wiring, and are disposed to cross the unit pixel area. A storage duplication wiring includes a first repair wiring STRL1 and a second repair wiring. The first repair wiring STRL1 is disposed in an area between the first data wiring DL1 and the first sub electrode SPE1, and is formed along the first data wiring DL1. The first repair wiring STRL1 is formed from substantially the same layer as the first and second storage wirings SL1 and SL2. The second repair wiring is disposed in an area between the second data wiring and the first sub electrode SPE1, and is formed along the second data wiring.

The second substrate 801 includes an upper substrate 810 facing a lower substrate 710, a light blocking pattern BM, color filters 820, an over-coating layer 830 and a common electrode 840.

The light blocking pattern BM is formed in the boundary area between the unit pixel areas. Accordingly, the light blocking pattern BM corresponds to the first data wiring DL1, the second data wiring, the first TFT and the second TFT.

The light blocking pattern BM defines openings, each corresponding to the shape of the corresponding unit pixel area. The color filters 820 are disposed in respective ones of the BM openings. The over-coating layer 830 covers the light blocking pattern BM and the color filters 820, and the common electrode 840 is formed on the over-coating layer 830.

The first repair wiring STRL1 and the second repair wiring are covered by the light blocking pattern BM, as illustrated in FIG. 12 so that the first repair wiring STRL and the second repair wiring do not decrease the opening ratio of the unit pixel area.

As described above, two storage wirings are disposed in each unit pixel area, and the two storage wirings are electrically connected to each other by a storage duplication wiring that is disposed along edges of the unit pixel area. As a result of this arrangement, even though any storage wiring may have a discontinuity at any point thereof, the maintaining voltage will still be applied to the storage wiring with the discontinuity through the remaining storage wiring and the storage duplication wiring. In conventional display panels, when the maintaining voltage is not applied as a result of a discontinuity in the storage wiring, the voltage difference between the pixel electrode and the common electrode pixel voltage will not be maintained during an image frame, thereby resulting in a pixel defect. However, as discussed above, in the exemplary display substrate embodiments described herein, the storage duplication wiring of the novel substrates prevents such pixel defects from occurring.

Moreover, when the storage wiring and a data wiring are inadvertently short-circuited to each other, the short-circuit can be readily repaired by cutting portions of the storage wiring, and even though portions of the storage wiring may then be cut, the maintaining voltage is nevertheless still applied to the two storage wirings through the storage duplication wiring, as described above, thereby preventing pixel defects resulting from such short circuits.

As those of skill in this art will by now appreciate, many modifications, substitutions and variations can be made in and to the materials, methods and configurations of the display panel substrates of the present invention without departing from its spirit and scope. In light of this, the scope of the present invention should not be limited to that of the particular embodiments illustrated and described herein, as they are only by way of examples thereof, but instead, should be fully commensurate with that of the claims appended hereafter and their functional equivalents.

What is claimed is:

1. A display substrate, comprising:
    a substrate, including a TFT layer having first and second gate wirings and a data wiring crossing the first and second gate wirings;
    a pixel electrode patterned in the shape of a unit pixel area on the TFT layer, the pixel electrode including;
    a first sub electrode receiving a first pixel voltage from the TFT layer; and,
    a second sub electrode electrically separated from the first sub electrode and receiving a second pixel voltage from the TFT layer;
    first storage wiring formed between and substantially parallel with the first and second gate wirings in the unit pixel area and operative to maintain the first pixel voltage and configured to receive a maintaining voltage from an external device;
    a second storage wiring formed between and substantially parallel with the first and second gate wirings in the unit pixel area and operative to maintain the second pixel voltage and configured to receive the maintaining voltage from the external device independently of the first storage wiring; and
    a storage duplication wiring formed along edges of the unit pixel area and electrically connecting the first storage wiring to the second storage wiring,
    wherein the storage duplication wiring is at an oblique angle to the data wiring and is not overlapped with the first and second sub electrodes, and
    wherein the storage duplication wiring extends along a space between the first sub electrode of the unit pixel area and the second sub electrode of another unit pixel area adjacent to the unit pixel area.

2. The display substrate of claim 1, wherein the TFT layer further comprises:
    a first TFT applying the first pixel voltage from the data wiring to the first sub electrode in response to a first control signal applied by the first gate wiring; and,
    a second TFT applying the second pixel voltage from the data wiring to the second sub electrode in response to a second control signal applied by the second gate wiring.

3. The display substrate of claim 2, wherein the unit pixel area is formed in a zigzag shape and in directions crossing the first and second wirings, respectively.

4. The display substrate of claim 1, wherein the first and second gate wirings, the first and second storage wirings and the storage duplication wiring are formed from substantially the same layer.

5. The display substrate of claim 1, wherein:
    an output electrode of the first TFT partially overlaps the first storage wiring; and,
    an output electrode of the second TFT partially overlaps the second storage wiring.

6. The display substrate of claim 1, wherein the TFT layer further comprises:
    a gate wiring disposed in a long direction of the first and second storage wirings; first and second wirings crossing the gate wiring;
    a first TFT applying the first pixel voltage from the first data wiring to the first sub electrode in response to a control signal applied by the gate wiring; and,
    a second TFT applying the second pixel voltage from the second data wiring to the second sub electrode in response to the control signal applied by the gate wiring.

7. The display substrate of claim 6, wherein the unit pixel area has a rectangular shape.

8. The display substrate of claim 7, wherein the unit pixel area comprises:
an effective light-transmission area in which the first and second sub electrodes are disposed; and,
a non-effective light-transmission area surrounding the effective light-transmission area and disposed along the gate wiring and the first and second data wirings.

9. The display substrate of claim 8, wherein the storage duplication wiring is formed from substantially the same layer as the gate wiring and comprises:
a first repair wiring disposed in the non-effective light-transmission area and along the first data wiring; and,
a second repair wiring disposed in the non-effective light-transmission area and along the second data wiring.

10. The display substrate of claim 9, wherein an output electrode of the first TFT partially overlaps one of the first and second storage wirings.

11. A display panel, comprising:
a first substrate, including:
a lower substrate having a gate wiring and a data wiring crossing the gate wiring;
a pixel electrode patterned in the shape of a unit pixel area on the lower substrate and having first and second sub electrodes, the first and second sub electrodes being electrically separated from each other and respectively receiving voltages of different levels;
a plurality of storage wirings formed substantially parallel with the gate wiring in the unit pixel area and maintaining the voltages, each storage wiring configured to receive a maintaining voltage from an external device independently of the other storage wirings; and
a storage duplication wiring formed along edges of the unit pixel area and electrically connecting the storage wirings, the storage wirings being disposed adjacent to the storage duplication wiring,
a second substrate, including:
an upper substrate facing the lower substrate;
color filters shaped correspondingly to the unit pixel area and disposed on the upper substrate;
a light blocking pattern formed in an area corresponding to a boundary area between the unit pixel areas; and,
a common electrode formed on the color filters and the light blocking pattern; and,
a liquid crystal layer disposed between the first substrate and the second substrate,
wherein the storage duplication wiring is at an oblique angle to the data wiring and is not overlapped with the first and second sub electrode, and
wherein the storage duplication wiring extends along a space between the first sub electrode of the unit pixel area and the second sub electrode of another unit pixel area adjacent to the unit pixel area.

12. The display panel of claim 11, wherein the light blocking pattern covers the storage duplication wiring corresponding to the boundary area between the unit pixel areas.

13. The display panel of claim 12, wherein the boundary area is formed in a zigzag shape and in a direction crossing the storage wirings.

14. The display panel of claim 12, wherein the boundary area is formed along sides of a rectangular shape.

15. The display panel of claim 12, wherein a domain divisional pattern is formed at the common electrode, and wherein the domain divisional pattern divides the first and second sub electrodes into a plurality of domains.

16. The display panel of claim 15, wherein the domain divisional pattern comprises an opening in the common electrode.

17. The display panel of claim 11, wherein the lower substrate further comprises:
a first TFT applying a first pixel voltage from the data wiring to the first sub electrode in response to a control signal applied by the gate wiring; and,
a second TFT applying a second pixel voltage from the data wiring to the second sub electrode in response to the control signal applied by the gate wiring.

* * * * *